United States Patent
Huang et al.

[11] Patent Number: 5,937,384
[45] Date of Patent: *Aug. 10, 1999

[54] METHOD AND SYSTEM FOR SPEECH RECOGNITION USING CONTINUOUS DENSITY HIDDEN MARKOV MODELS

[75] Inventors: Xuedong D. Huang; Milind V. Mahajan, both of Redmond, Wash.

[73] Assignee: Microsoft Corporation, Redmond, Wash.

[*] Notice: This patent is subject to a terminal disclaimer.

[21] Appl. No.: 08/655,273

[22] Filed: May 1, 1996

[51] Int. Cl.$^6$ ........................................................ G10L 5/06
[52] U.S. Cl. ........................ 704/256; 704/251; 704/254; 704/255
[58] Field of Search ...................................... 704/2.65, 2.6, 704/2.63, 2.66, 251, 254–257

[56] References Cited

U.S. PATENT DOCUMENTS

| | | | |
|---|---|---|---|
| 4,783,803 | 11/1988 | Baker et al. | 381/42 |
| 4,817,156 | 3/1989 | Bahl et al. | 381/43 |
| 4,829,577 | 5/1989 | Kuroda et al. | 381/45 |
| 4,866,778 | 9/1989 | Baker | 381/43 |
| 5,027,406 | 6/1991 | Roberts et al. | 381/43 |
| 5,267,345 | 11/1993 | Brown et al. | 395/2.64 |
| 5,268,990 | 12/1993 | Cohen et al. | 395/2 |
| 5,293,584 | 3/1994 | Brown et al. | 395/2.86 |
| 5,333,236 | 7/1994 | Bahl et al. | 395/2.65 |
| 5,444,617 | 8/1995 | Merialdo | 364/419.1 |
| 5,581,655 | 12/1996 | Cohen et al. | 395/2.54 |
| 5,621,859 | 4/1997 | Schwartz et al. | 395/2.65 |
| 5,627,939 | 5/1997 | Huang et al. | 395/2.65 |
| 5,642,519 | 6/1997 | Martin | 395/759 |
| 5,710,866 | 1/1998 | Alleva et al. | 395/2.65 |

OTHER PUBLICATIONS

Bahl, et al., "A Maximum Likelihood Approach to Continuous Speech Recognition," *IEEE Transactions on Pattern Analysis and Machine Intelligence*; 1983; pp. 308–319.

Lee, Kai–Fu, "Context–Dependent Phonetic Hidden Markov Models for Speaker–Independent Continuous Speech Recognition," *IEEE Transactions on Acoustics, Speech and Signal Processing*; Apr. 1990; pp. 347–362.

Huang, Xuedong et al., "An Overview of the SPHINX–II Speech Recognition System," *Proceedings of ARPA Human Language Technology Workshop*; 1993; pp. 1–6.

Huang, X.D., and M. A. Jack, "Semi–continuous hidden Markov models for speech signals," *Computer Speech and Language*, vol. 3; 1989; pp. 239–251.

Baker, James K., "Stochastic Modeling for Automatic Speech Understanding," *Speech Recognition*, Editor P.R. Reddy; pp. 297–307.

"1993 IEEE International Conference on Acoustics, Speech, and Signal Processing." *ICASSP–93—Speech Processing Volume II of V*, Minneapolis Convention Center; Apr. 27–30, 1993; pp. 311–314.

(List continued on next page.)

*Primary Examiner*—David R. Hudspeth
*Assistant Examiner*—Michael N. Opsasnick
*Attorney, Agent, or Firm*—Westman, Champlin & Kelly, P.A.

[57] ABSTRACT

A method and system for achieving an improved recognition accuracy in speech recognition systems which utilize continuous density hidden Markov models to represent phonetic units of speech present in spoken speech utterances is provided. An acoustic score which reflects the likelihood that a speech utterance matches a modeled linguistic expression is dependent on the output probability associated with the states of the hidden Markov model. Context-independent and context-dependent continuous density hidden Markov models are generated for each phonetic unit. The output probability associated with a state is determined by weighing the output probabilities of the context-dependent and context-independent states in accordance with a weighting factor. The weighting factor indicates the robustness of the output probability associated with each state of each model, especially in predicting unseen speech utterances.

23 Claims, 8 Drawing Sheets

OTHER PUBLICATIONS

Gelsema et al. (Ed.), "Pattern Recognition in Practice," *Proceedings of an International Workshop held in Amsterdam*; May 21–23, 1980; pp. 381–402.

Rabiner, Lawrence, and Biing–Hwang Juang, "Fundamentals of Speech Recognition," Prentice Hall Publishers; 1993; Chapter 6; pp. 372–373.

Lee, Kai–Fu et al., "Automatic Speech Recognition—The Development of the SPHINX System," Kluwer Academic Publishers; 1989; pp. 51–62, and 118–126.

Huang, X.D. et al., "Hidden Markov Models for Speech Recognition," Edinburgh University Press; 1990; pp. 210–212.

"Developing NeXTSTEP™ Applications," SAMS Publishing; 1995; pp. 118–144.

Rabiner et al., "High Performance Connected Digit Recognition Using Hidden Markov Models," Proceedings of ICASSP–88, 1998; pp. 320–330.

Moulines, Eric, and Francis Charpentier, "Pitch–Synchronous Waveform Processing Techniques for Text–To–Speech Synthesis Using Diphones," *Speech Communications 9*; 1990; pp. 453–467.

Breckenridge Pierrehumbert, Janet, "The Pholology and Phonetics of English Intonation," Massachusetts Institute of Technology, Sep. 1980, pp. 1–401.

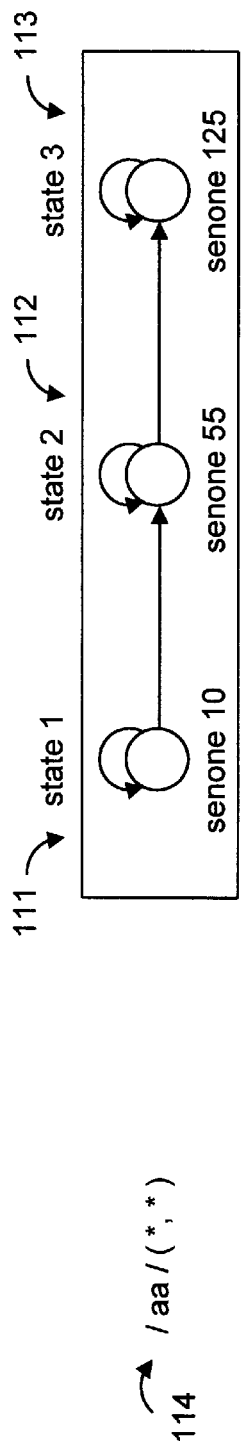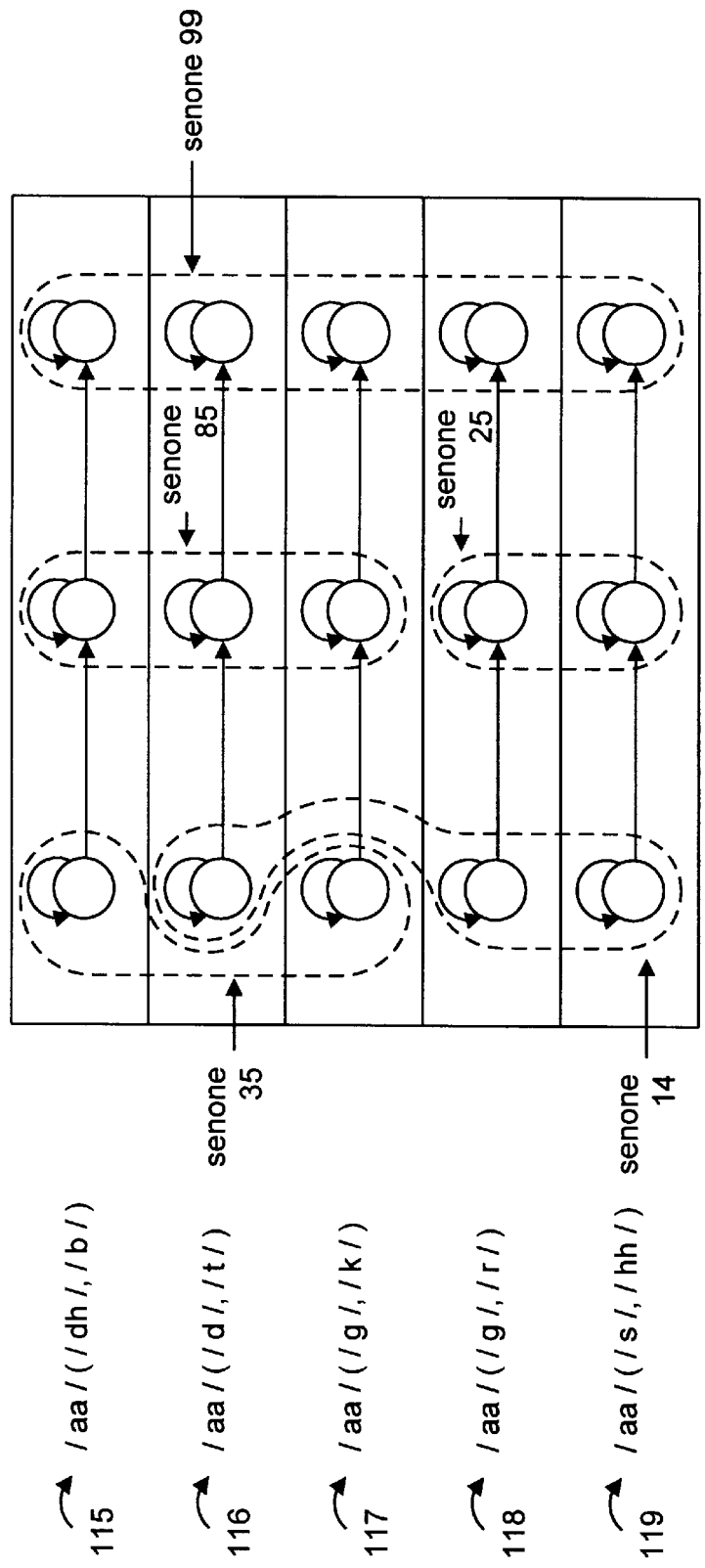

METHOD AND SYSTEM FOR SPEECH RECOGNITION USING CONTINUOUS DENSITY HIDDEN MARKOV MODELS

TECHNICAL FIELD

The present invention relates to computer speech recognition, and more particularly, to a computer speech recognition system that utilizes continuous hidden Markov models.

BACKGROUND OF THE INVENTION

The area of speech recognition is challenged by the need to produce a speaker-independent continuous speech recognition system which has a minimal recognition error rate. The focus in realizing this goal is on the recognition algorithm that is utilized by the speech recognition system. The recognition algorithm is essentially a mapping of the speech signal, a continuous-time signal, to a set of reference patterns representing the phonetic and phonological descriptions of speech previously obtained from training data. In order to perform this mapping, signal processing techniques such as fast fourier transforms (FFT), linear predictive coding (LPC), or filter banks are applied to a digital form of the speech signal to extract an appropriate parametric representation of the speech signal. A commonly-used representation is a feature vector containing for each time interval, the FFT or LPC coefficients that represent the frequency and/or energy bands contained in the speech signal. A sequence of these feature vectors is mapped to the set of reference patterns which identify linguistic units, words and/or sentences contained in the speech signal.

Often, the speech signal does not exactly match the stored reference patterns. The difficulty in finding an exact match is due to the great degree of variability in speech signal characteristics which are not completely and accurately captured by the stored reference patterns. Probabilistic models and statistical techniques have been used with more success in predicting the intended message than techniques that seek an exact match. One such technique is Hidden Markov Models (HMMs). These techniques are more adept for speech recognition since they determine the reference pattern that will more likely match the speech signal rather than finding an exact match.

A HMM consists of a sequence of states connected by transitions. A HMM can represent a particular phonetic unit of speech, such as a phoneme or word. Associated with each state is an output probability indicating the likelihood that the state matches a feature vector. For each transition, there is an associated transition probability indicating the likelihood of following the transition. The transition and output probabilities are estimated statistically from previously spoken speech patterns, referred to as "training data." The recognition problem is one of finding the state sequence having the highest probability of matching the feature vectors representing the input speech signal. Primarily, this search process involves enumerating every possible state sequence that has been modeled and determining the probability that the state sequence matches the input speech signal. The utterance corresponding to the state sequence with the highest probability is selected as the recognized speech utterance.

Most HMM-based speech recognition systems are based on discrete HMMs utilizing vector quantization. A discrete HMM has a finite set of output symbols and the transition and output probabilities are based on discrete probability distribution functions (pdfs). Vector quantization is used to characterize the continuous speech signal by a discrete representation referred to as a codeword. A feature vector is matched to a codeword using a distortion measure. The feature vector is replaced by the index of the codeword having the smallest distortion measure. The recognition problem is reduced to computing the discrete output probability of an observed speech signal as a table look-up operation which requires minimal computation.

However, speech signals are continuous signals. Although it is possible to quantitize continuous signals through codewords, there may be serious degradation associated with such quantization resulting in poor recognition accuracy. Recognition systems utilizing continuous density HMMs do not suffer from the inaccuracy associated with quantization distortion. Continuous density HMMs are able to directly model the continuous speech signal using estimated continuous density probability distribution functions, thereby achieving a higher recognition accuracy. However, continuous density HMMs require a considerable amount of training data and require a longer recognition computation which has deterred their use in most commercial speech recognition systems. Accordingly, a significant problem in continuous speech recognition systems has been the use of continuous density HMMs for achieving high recognition accuracy.

SUMMARY OF THE INVENTION

The present invention pertains to a speech recognition system which improves the modeling of the speech signal to continuous density HMM corresponding to a linguistic expression. In the preferred embodiment, the recognition system utilizes a context-independent and several context-dependent HMMs to represent the speech unit of a phoneme in different contextual patterns. The output and transition probabilities for each of these HMMs are estimated from the training data. The output probabilities associated with like states corresponding to the same modeled phoneme are clustered forming senones. A weighting factor for each context-dependent senone which indicates the robustness of the output probability in predicting unseen data is also generated. In the preferred embodiment, the weighting factor is estimated through deleted interpolation of all the data points in the training data. Alternatively, the weighting factor can be estimated from a parametric representation of the data points or from randomly-generated data points generated from a parametric representation of the data points.

The recognition engine receives an input speech utterance and generates candidate word sequences which will most likely match the feature vectors of the input speech utterance. The word sequences can be composed of various senone alignments corresponding to state sequences of HMMs. The recognition engine determines which senone/state alignment best matches the feature vectors by utilizing an acoustic and language probability score. The acoustic probability score represents the likelihood that the senone alignment corresponds to the feature vectors and the language probability score indicates the likelihood of the utterance corresponding to the senone alignment occurring in the language. The acoustic probability score is based on an output and transition probability analysis. The output probability analysis utilizes the output probabilities of both the context-dependent and context-independent senones by weighing each output probability as a function of the weighting factor. The output probability having the more robust estimate will dominate the analysis thereby improving the output probability analysis. An improvement in the output probability analysis improves the acoustic score and, in turn, the overall recognition accuracy.

BRIEF DESCRIPTION OF THE DRAWINGS

The foregoing and other features and advantages of the invention will be apparent from the following more particular description of the preferred embodiment of the invention, as illustrated in the accompanying drawings in which like reference characters refer to the same elements throughout the different views. The drawings are not necessarily to scale, emphasis instead being placed upon illustrating the principles of the invention.

FIGS. 7A and 7B depict an example of the hidden Markov models and senone structures associated with a phoneme.

DETAILED DESCRIPTION OF THE INVENTION

The preferred embodiment of the present invention recognizes that an improved recognition accuracy can be obtained in speech recognition systems that employ continuous density hidden Markov models by weighing different output probabilities representing the same phonetic unit relative to the degree to which each output probability can predict unseen data. The speech recognition system of the claimed invention receives an input speech utterance, in the form of a continuous signal, and generates the most likely linguistic expression that corresponds to the utterance. The preferred embodiment recognizes a linguistic expression by matching a set of feature vectors that form a parametric representation of the speech signal to a sequence of hidden Markov models (HMMs) which identify possible linguistic expressions. A HMM may represent a phoneme, and a sequence of HMMs may represent words or sentences composed of phonemes.

Continuous density probability distribution functions, such as a mixture of Gaussian probability distribution functions, can be utilized to represent the output probability of a state, since they are more accurate at modeling a speech signal. The output probability function is statistically estimated from training data. Often there is an insufficient amount of training data to accurately estimate the output probability function. To account for this problem, context-independent and context-dependent models are constructed for a predetermined set of phonemes. The output probabilities of the context-independent model are then interpolated with the output probabilities of the context-dependent model. This is done through a weighting or interpolation factor which estimates the degree to which the output probability function of the context-dependent HMM can predict data not previously encountered in the training data. Thus, the new modified output probability function of a context-dependent state is a combination of the output probability functions of both models weighed in accordance with the robustness of the estimates. Accordingly, in the preferred embodiment, deleted interpolation is used to smooth the probability space rather than the parameter space.

Figure 1:
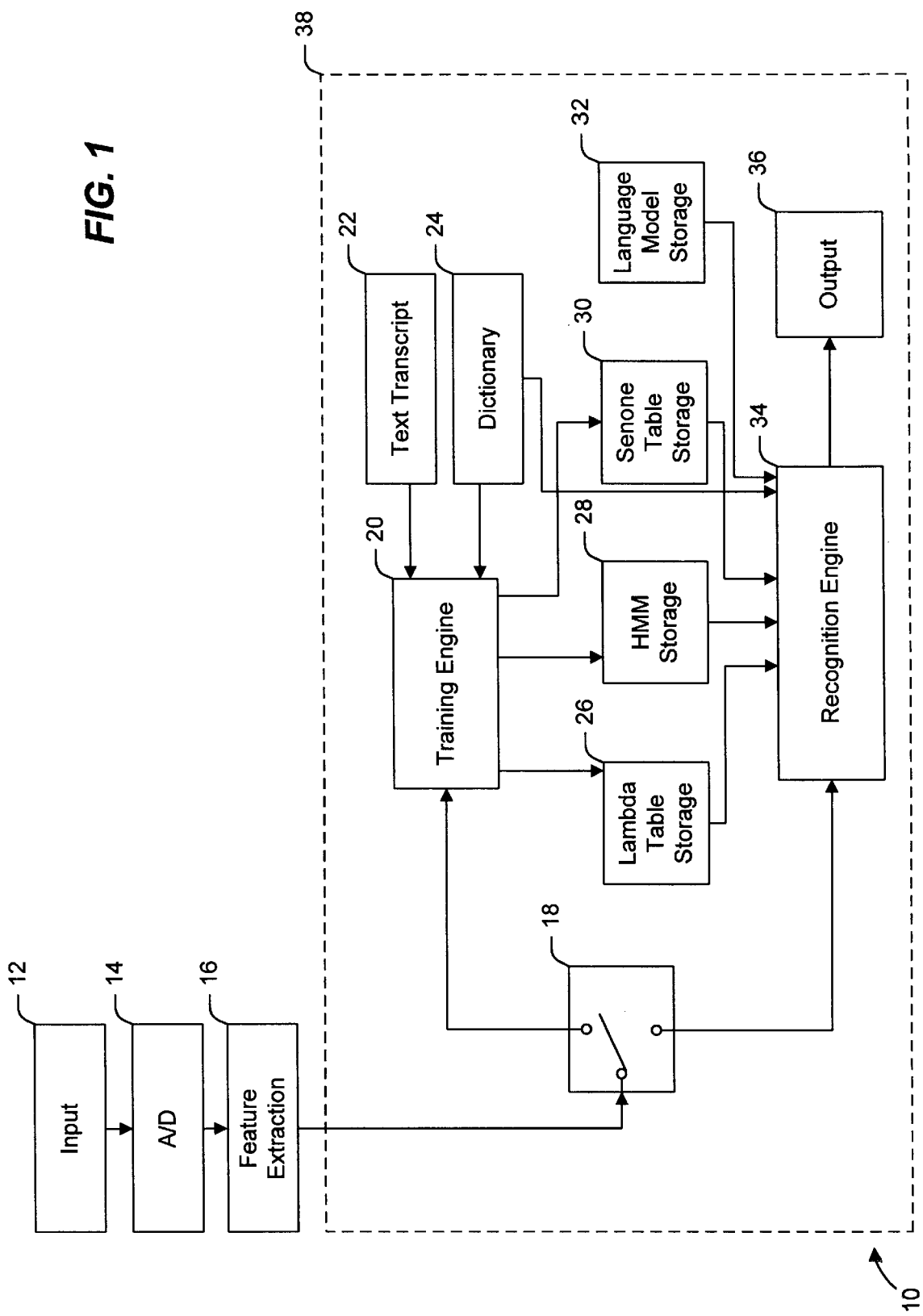
FIG. 1 is a block diagram of a speech recognition system employed in the preferred embodiment.

FIG. 1 illustrates a speech recognition system 10 which can be used to implement the recognition and training processes in accordance with the preferred embodiment of the invention. The speech recognition system 10 contains an input device 12, such as but not limited to a microphone, which receives an input speech utterance and generates a corresponding analog electric signal. Alternatively, a stored speech utterance that is stored on a storage device can be used as the input speech utterance. The analog electric signal corresponding to the speech utterance is transmitted to analog-to-digital (A/D) converter 14, which converts the analog signal to a sequence of digital samples. The digital samples are then transmitted to a feature extractor 16 which extracts a parametric representation of the digitized input speech signal. This parametric representation captures the acoustic properties of the input speech utterance. Preferably, the feature extractor 16 performs spectral analysis to generate a sequence of feature vectors, each of which contains coefficients representing a spectra of the input speech signal. Methods for performing the spectral analysis are well-known in the art of signal processing and can include fast Fourier transforms (FFT), linear predictive coding (LPC), and cepstral coefficients, all of which can be utilized by feature extractor 16. Feature extractor 16 can be any conventional processor that performs spectral analysis. Spectral analysis may be performed every ten milliseconds to divide the input speech signal into a feature vector which represents twenty-five milliseconds of the utterance. However, this invention is not limited to using feature vectors that represent twenty-five milliseconds of the utterance. Feature vectors representing different lengths of time of a speech utterance can also be used. This process is repeated for the entire input speech signal and results in a sequence of feature vectors which is transmitted to a data processor 38. Data processor 38 can be any conventional computer, such as a desktop personal computer. The data processor contains a switching block 18 which routes the sequence of feature vectors. Switching block 18 can be implemented in hardware or software. However, the speech recognition system is not limited to executing on a data processor. Other types of executable mediums can be used, such as but not limited to, a computer readable storage medium which can be a memory device, compact disc, or floppy disk.

During the initial training phase, switching block 18 is switched to direct the feature vectors to the training engine 20. Training engine 20 utilizes the feature vectors to estimate the parameters of the HMMs which will represent the phonemes present in the training data and to compute a set of weighting factors for use by the recognition engine 34. A more detailed description of the method employed by training engine 20 is presented below with reference to FIGS. 2-6. Briefly, the training engine 20 generates context-independent and context-dependent phoneme-based hidden Markov models by estimating the parameters for these models from the training data. The output distributions for each context-dependent state are clustered forming senones which are stored in senone table storage 30. The senone table storage 30, in general, holds senones for both context-dependent and context-independent HMMs. Senones identifiers for each HMM are stored in the HMM storage 28. In addition, a weighting factor for each context-dependent senone is calculated and stored in lambda table storage 26 for use by the recognition engine 34. The lambda table storage 26 holds lambda values indexed by context-dependent HMMs. The training engine 20 also utilizes a text transcript that holds a translation 22 of the training data and a dictionary 24 that contains a phonemic description of each word in order to assure that each word is correctly modeled. A more detailed description of the operation of the training engine 20 will be discussed below. The dictionary 24 contains a pronunciation of each word in terms of phonemes. For example, a dictionary entry for "add" might be "/AE DD/."

After the initial training phase, switching block 18 is switched to transmit the feature vectors to recognition engine 34. Recognition engine 34 recognizes the sequence of feature vectors as a linguistic expression composed of phonemes that form words, which, in turn, form sentences. A detailed description of the method employed by the recognition engine 34 is presented below with reference to FIG. 8. Recognition engine 34 utilizes the context-independent and context-dependent hidden Markov models stored in HMM storage 28, the context-dependent and context-independent senones stored in senone table storage 30, the weighting factors stored in lambda table storage 26, and a language model stored in language model storage 32 and dictionary 24. The language model storage 22 may specify a grammar. In the preferred embodiment, the linguistic expression which is generated from recognition engine 34 is displayed to an output device 36, such as a conventional printer, computer monitor, or the like. However, this invention is not limited to displaying the linguistic expression to an output device. For example, the linguistic expression can be used as input into another program or processor for further processing or may be stored.

FIGS. 2–6 are flow charts that illustrate the steps performed in the training phase of the system where the parameters of the HMMs and senones are estimated and the weighting factors are calculated. In short, the training method starts off by receiving input speech utterances, in the form of words, sentences, paragraphs, or the like, and converts them to parametric representations, known as feature vectors. The structure of the hidden Markov models and senones is formed and estimates of the parameters for these data structures are calculated from the training data. The weighting factors are then determined through the technique of deleted interpolation.

Figure 2:
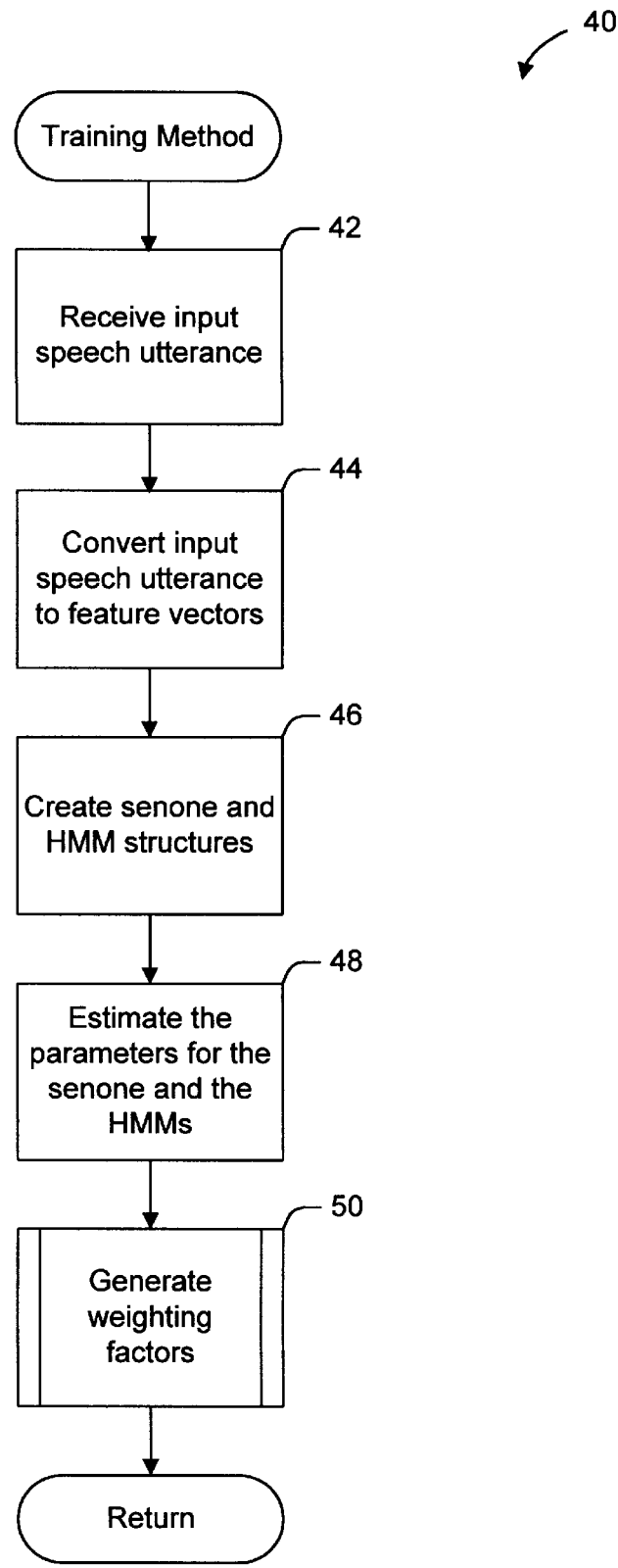
FIG. 2 is a flow diagram of a training method used in the system of FIG. 1.

Referring to FIG. 2, the training method commences by receiving a sequence of speech utterances (step 42) which is converted into a sequence of feature vectors (step 44) as previously described above with reference to FIG. 1. The complete set of feature vectors is referred to as the "training data." In the preferred embodiment, LPC cepstral analysis is employed to model the speech signal and results in a feature vector that contains the following 39 cepstral and energy coefficients representing the frequency and energy spectra contained in the signal: (1) 12 LPC mel-frequency cepstral coefficients, $x_K(t)$, for $1<=K<=12$; (2) 12 LPC delta mel-frequency cepstral coefficients $\Delta x_K(t)$, for $1<=K<=12$; (3) 12 LPC delta-delta mel-frequency cepstral coefficients $\Delta\Delta x_K(t)$, for $1<=K<=12$; and (4) energy, delta energy, and delta—delta energy coefficients. The use of LCP cepstral analysis to model speed signals is well known in the art of speech recognition systems.

In step 46, senone and HMM data structures are generated. Senones are well-known data structure in speech recognition systems and a detailed description of senones and the method used to construct them can be found in M. Huang et al., "Predicting Unseen Triphones with Senones," Proc. ICASSP '93 Vol. II, pp. 311–314, 1993. In the preferred embodiment, a HMM can be used to model the speech unit of a phoneme. The HMM can also be referred to as an acoustic model. This speech unit is selected in order to accommodate large-vocabulary recognition. Modeling individual words requires a longer training period and additional storage to store the associated parameters. This is feasible for small vocabulary systems but impractical for those which utilize large vocabularies. However, this invention is not limited to phoneme-based HMMs. Other speech units, such as words, diphones, and syllables can be used as the basis of the HMMs.

Two types of HMMs can be utilized. A context-dependent HMM can be used to model a phoneme with its left and right phonemic contexts. This type of model captures the contextual dependencies which are usually present in word modeling. A context-independent HMM can be used to model the phoneme in any context that it appears in the training data, therefore making it independent of any particular context. Predetermined patterns consisting of a set of phonemes and their associated left and right phonemic contexts are selected to be modeled by the context-dependent HMM. These selected patterns represent the most frequently occurring phonemes and the most frequently occurring contexts of these phonemes. The training data will provide the estimates for the parameters of these models. The context-independent models will be based on the selected phonemes and modeled within whatever phonemic context appears in the training data. Similarly, the training data will provide the estimates for the parameters of the context-independent models.

The use of both a context-independent and context-dependent model is beneficial in achieving an improved recognition accuracy. Each model's robustness is related to the amount of training data used to estimate its parameters which also enables it to predict data not present in the training data. The combination of the two models provides a more robust estimate benefiting from the training of both models. For example, the context-dependent model is beneficial at modeling co-articulatory effects but may be poorly trained due to limited training data. (Although a speaker may try to pronounce words as concatenated sequences of phones, the speaker's articulator cannot move instantaneously to produce unaffected phones. As a result, a phone is strongly inverted by the phone that precedes it and the phone that follows it in a word. The effects are "coarticulatory effects"). By contrast, the context-independent model is highly trainable thereby producing more robust estimates which are less detailed. The combination of these two models, weighed in the appropriate manner, can be used by the recognition engine to produce a more accurate acoustic probability score.

Further to account for the between-speaker differences, such as the formant frequencies (ie., vocal tract resonance frequencies), present in the male and female vocal tracts, the HMM can utilize a mixture of unimodal distributions for the output probability distributions functions (referred to throughout this application as "output pdf"). Preferably, a mixture of Gaussian probability density functions can be used. However, this invention is not constrained to this particular limitation. Mixtures of other well-known continuous density functions can be used, such as the Laplacian and $K_0$-type density functions.

Further, to capture similarity between states of different context-dependent phonemes and to increase the amount of training data available for each senone, the output distributions of like states of different context-dependent phonetic HMM models for the same context-independent phone are clustered together forming senones.

FIG. 7A illustrates an example of a context-independent HMM structure for the phoneme /aa/ 114. The context-independent HMM includes three states, denoted as state 1 (111), state 2 (112), and state 3 (113). The HMM depicted in FIG. 7A models the phoneme /aa/ with any left and right phonemes that appear in the training data as designated by the notation (*,*) in FIG. 7A. The first position within the parentheses designates the phoneme that precedes the given phoneme and the second position designates the phoneme that follows the given phoneme. Senones are classified within like states (e.g., state 1) for each type of model (e.g., context-dependent vs. context-independent) corresponding to the same phoneme. In this example, the context-independent HMM has senones 10, 55, and 125 corresponding to states 1, 2 and 3 respectively.

FIG. 7B shows an example of corresponding context-dependent HMMs for the phoneme /aa/. In FIG. 7B there are five context-dependent models which model the phoneme /aa/ in five distinct phonemic contexts (115–119). For example, the context-dependent model /aa/ (/dh/, /b/) 115, models the phoneme /aa/ in a context where the left or preceding phoneme is /dh/ and where the phoneme /b/ succeeds or is to the right of it. The senones are classified within like states in the different HMMs. In state 1, there are two context-dependent senones, denoted as senones 14 and 25. Overall, for the phoneme /aa/, there are 2 context-dependent senones 14 and 35 and 1 context-independent senone 10 for state 1; 2 context-dependent senones 25 and 85 and 1 context-independent senone 55 for state 2; and 1 context-dependent senone 99 and context-independent senone 125 for state 3.

Accordingly the phoneme-based continuous density HMM used in the preferred embodiment can be characterized by the following mathematical definition:

(1) N, the number of states in the model: preferably, three states are employed. However, the invention is not restricted to three, as many as five may alternatively be used.

(2) M, the number of mixtures in the output pdf.

(3) $A=\{a_{ij}\}$, the state transition probability distribution, from state i to state j.

(4) $B=\{b_i(x)\}$, output probability distribution: the probability of emitting feature vector x when in state i, where $$b_i(x) = \sum_{k=1}^{M} c_k N(x, \mu_k, V_k), \quad (1)$$

where $N(x, \mu_k, V_k)$ denotes the multi-dimensional Gaussian density function defined by mean vector $\mu_k$ and covariance matrix $V_k$;

The number M of mixture-components is typically, anywhere from 1 to 50; and $c_k$ is the weight for the kth mixture component in state i.

The output probability distribution associated with each state i, is represented by senone, $sd_i$ and can be denoted as $p(x_1 \, sd_i)$.

$\pi=\{\pi_I\}$, the initial state distribution.

For convenience, the compact notation $=(A, B, \pi)$ is used to denote the complete parameter set of the model which is otherwise known as the parameter space of a HMM.

In step 48 of FIG. 2, the parameters for the senone, context-dependent HMM, and the context-independent HMM are estimated. The training phase of a HMM consists of estimating these parameters using the training data, a text of the speech 22, and a dictionary of phonemic spellings of words 24. The output and transition probabilities can be estimated by the well-known Baum-Welch or forward-backward algorithm. The Baum-Welch algorithm is preferred since it makes better use of training data. It is described in Huang et al., *Hidden Markov Models For Speech Recognition*, Edinburgh University Press, 1990, which is hereby incorporated by reference. It is also described in U.S. Pat. No. 4,829,577 issued to Kuroda et al. on Apr. 9, 1989. The portions of U.S. Pat. No. 4,829,577 that describe the forward-backward algorithm are hereby incorporated by reference. However, this invention is not limited to this particular training algorithm, others may be utilized. Normally, about five iterations through the training data can be made to obtain good estimates of the parameters.

In step 50 of FIG. 2, weighting or interpolation factors for each content-dependent senone are generated and are denoted by the mathematical symbol, $\lambda$. The weighting factors will be used to interpolate the output probabilities of the context-independent HMM with the output probabilities of the context-dependent HMM. The weighting factors indicate the adeptness of the context-dependent output pdf at predicting unseen data. The output pdf is estimated with training data and will closely predict data which resembles the training data. However, it is impossible to estimate the output pdf with training data that represents every possible input speech utterance, or with sufficient training data for it to predict all unseen data correctly. The role of the weighting factor is to indicate the adeptness of the output pdf to predict unseen data which is a function of the training data used to estimate the context-dependent and context-independent models. As the amount of training data for the context-dependent models gets large, $\lambda$ will approach 1.0 and the output pdf will be heavily weighed. With a small amount of training data for the context-dependent model, $\lambda$ will approach 0.0 and the output pdf will be weighed less. The optimal value for $\lambda$ for each context-dependent senone is determined by deleted interpolation.

Briefly, the technique of deleted interpolation partitions the training data into two distinct sets. One set is used to estimate the parameters of the model and a second set is used to determine the weighting factor which indicates how well the output pdf can predict unseen training data. This process is iterative where at each iteration the different sets are rotated and a new model and weighting factor is produced. At the end of all the iterations, the average value of the weighting factor is calculated and used in the recognition phase.

Figure 3:
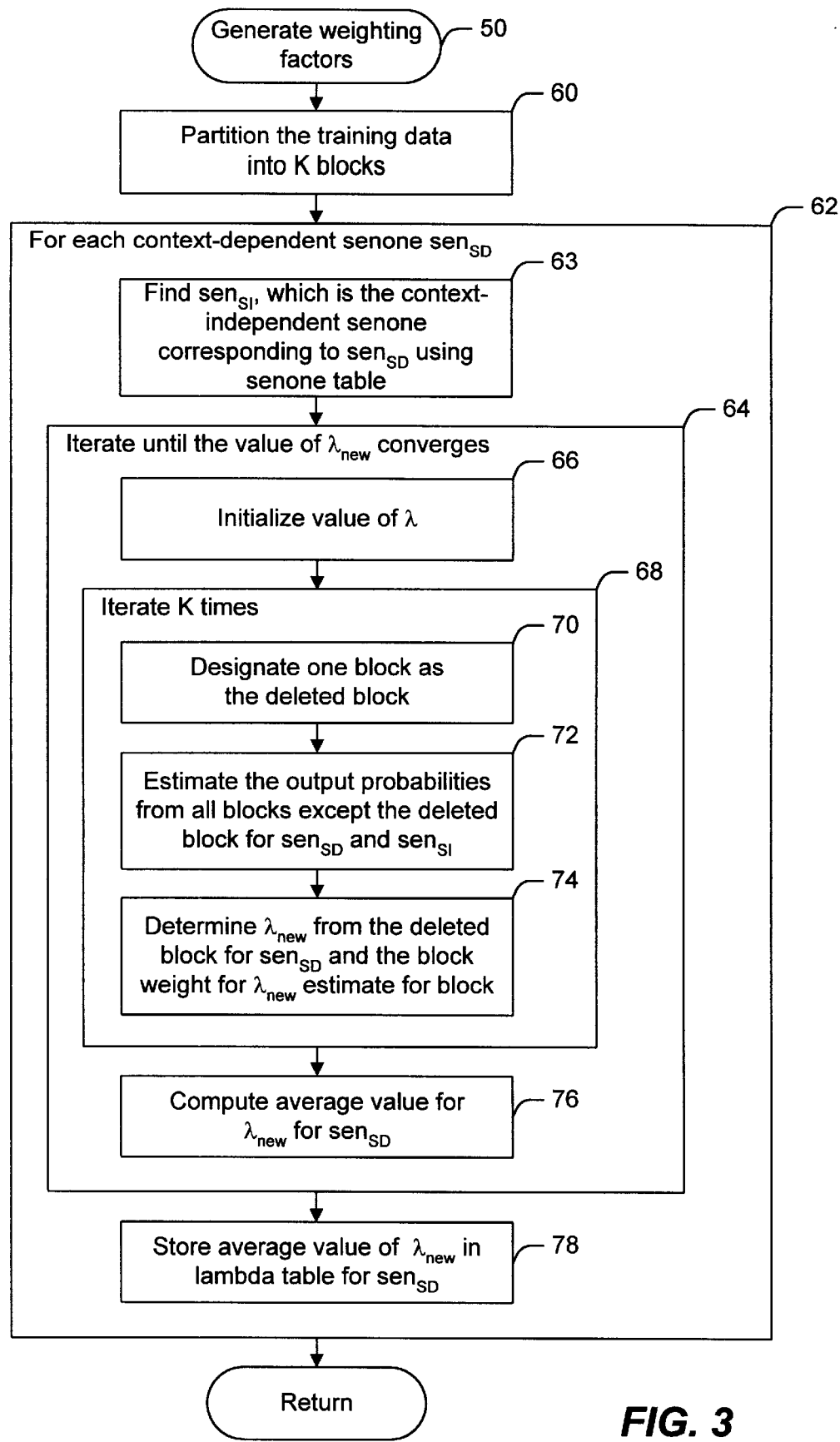
FIG. 3 is flow diagram of the method for calculating weighing factors used in the system of FIG. 1.

FIGS. 3–6 illustrate the steps used in computing the weighting factors. Referring to FIG. 3, the training data is partitioned into K blocks in step 60. Preferably, there are two blocks of data. However, the invention is not limited to this number of blocks, others may be used dependent on the constraints of training data storage and training time.

A weighting factor is calculated for each context-dependent senone (step 62) by first finding sense, which is the context-independent senone that corresponds to $sen_{SD}$ (ie., the context-dependent senone) using the senone table (step 63). The calculation is derived through an iterative process, step 64, which converges when the difference between the new value of $\lambda$, denoted as $\lambda_{new}$, meets a certain threshold. Preferably, the process converges or finishes when $|\lambda - \lambda_{new}| < 0.0001$. The process commences by selecting an initial value for λ, step 66. Initially, for the first iteration of a senone, an initial value is preselected by the user. Preferably, the initial value can be an estimated guess as 0.8. For all other iterations, the initial value will be the previously calculated new value, $\lambda = \lambda_{new}$. In step 68, the process iterates K times. At each iteration, one block of data is selected as the deleted block, and the selected deleted block is one that was not chosen previously, step 70.

The process then proceeds to estimate the output probabilities for each context-dependent (denoted as $b_1$) and context-independent (denoted as $b_2$) senone using the training data from all the blocks except the deleted block (step 72). These parameters are estimated using the same technique as described above in reference to the estimation of the parameters of the HMMs in the training phase (ie., Baum-Welch algorithm).

Next in step 74, a new value, $\lambda_{new}$, is computed. The computation assumes that "forced alignment" is used. During training, if the Viterbi algorithm is used, each feature vector in the training data can be identified with a specific senone. This mapping or vectors with senone is known as "forced alignment." $\lambda_{new}$ is calculated in accord with the following mathematical definition:

$$\lambda_{new} = \frac{1}{N} \sum_{i=1}^{N} \frac{(\lambda * b_1(x_i))}{(\lambda * b_1(x_i) + (1-\lambda) * b_2(x_i))} \quad (2)$$

where

N=number of data points or feature vectors in the deleted block that corresponds to senone $sen_{SD}$ using forced alignment;

$x_i$=feature vector i, $1 \leq i \leq N$;

$b_1(x_1)$=context-dependent output pdf as defined by equation (1) above;

$b_2(x_i)$=context-independent output pdf as defined by equation (1) above;

$\lambda * b_1(x_1) + (1-\lambda) * b_2(x_1)$=referred to as the overall probability.

A value of $\lambda_{new}$ is determined for each of the K iterations. At the completion of all K iterations, in step 76, an average value is computed which can be represented by the following mathematical expression:

$$\lambda_{new} = \frac{\sum_{j=1}^{K} N_j \lambda_{new}^j}{\sum_{j=1}^{K} N_j} \quad (3)$$

where j=index of deleted block;

K=number of blocks;

$\lambda_{new}^j$=estimate of λ using deleted block j; and $N_j$=number of points in deleted block j that correspond to $sen_{SD}$ using forced alignment.

Steps 66 through 76 are executed again if the value of $\lambda_{new}$ does not meet the prescribed threshold. When the process converges for a particular context-dependent senone, the current value of $\lambda_{new}$ is stored in lambda table 26 for the particular context-dependent senone.

Figure 4:
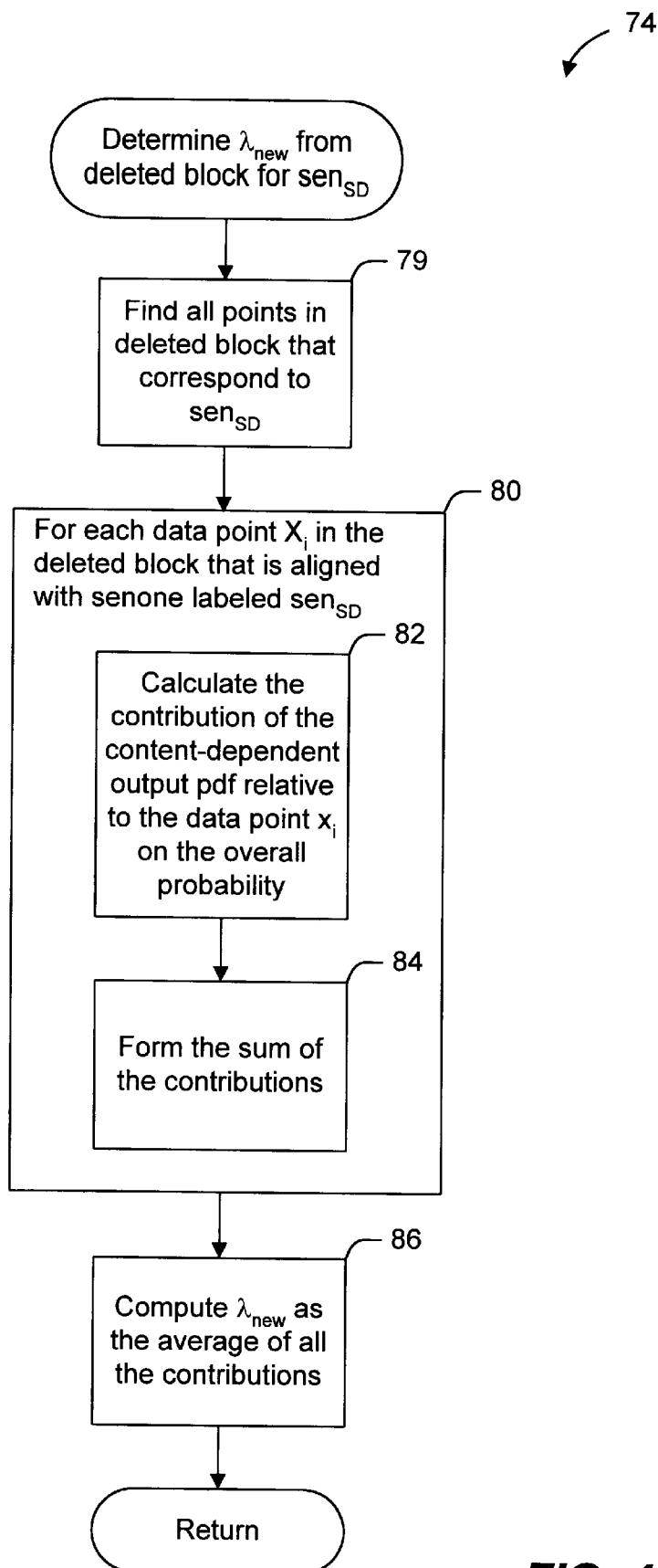
FIG. 4 is a flow diagram of the preferred embodiment for calculating a new value for lambda as used in the system of FIG. 3.

FIG. 4 depicts a flowchart of the steps used in computing the new value for the weighting factor, $\lambda_{new}$, in accord with equations (2) and (3) above. The new value is computed by summing the contribution of the context-dependent output pdf relative to the overall probability for each data point in the deleted block. Thus, in step 79, all points in the deleted block that correspond to $sen_{SD}$ are found using the model generated in step 48 and forced alignment. In step 80, the process iterates for each data point $x_i$ in the deleted block that is aligned with $sen_{SD}$. The contribution of the context-dependent output pdf for data point $x_i$ relative to the overall probability is determined in step 82 in accord with the following mathematical definition:

$$\frac{(\lambda * b_1(x_i))}{(\lambda * b_1(x_i) + (1-\lambda) * b_2(x_i))} \quad (4)$$

The sum of the contributions for all data points computed thus far are totaled in step 84. At the completion of the iteration when all the data points in the deleted block that are aligned with $sen_{SD}$ have been processed, the average of the contributions is computed, $\lambda_{new}$, step 86 in accord with equation (2) above.

The above computation of the weighting factor uses the data points in the deleted block. This produces a more accurate computation at the expense of increasing the training time as well as the amount of storage needed by the training engine to perform the computations. In some instances, it may be more advantageous to generate a parametric representation of the data points in the deleted block that correspond and to use the appropriate parameters instead. Another alternative is to use reconstructed data points from the parametric representation of the data points to $sen_{SD}$. These alternatives provide a coarse approximation of the data points but has the advantage of computational efficiency.

Figure 5:
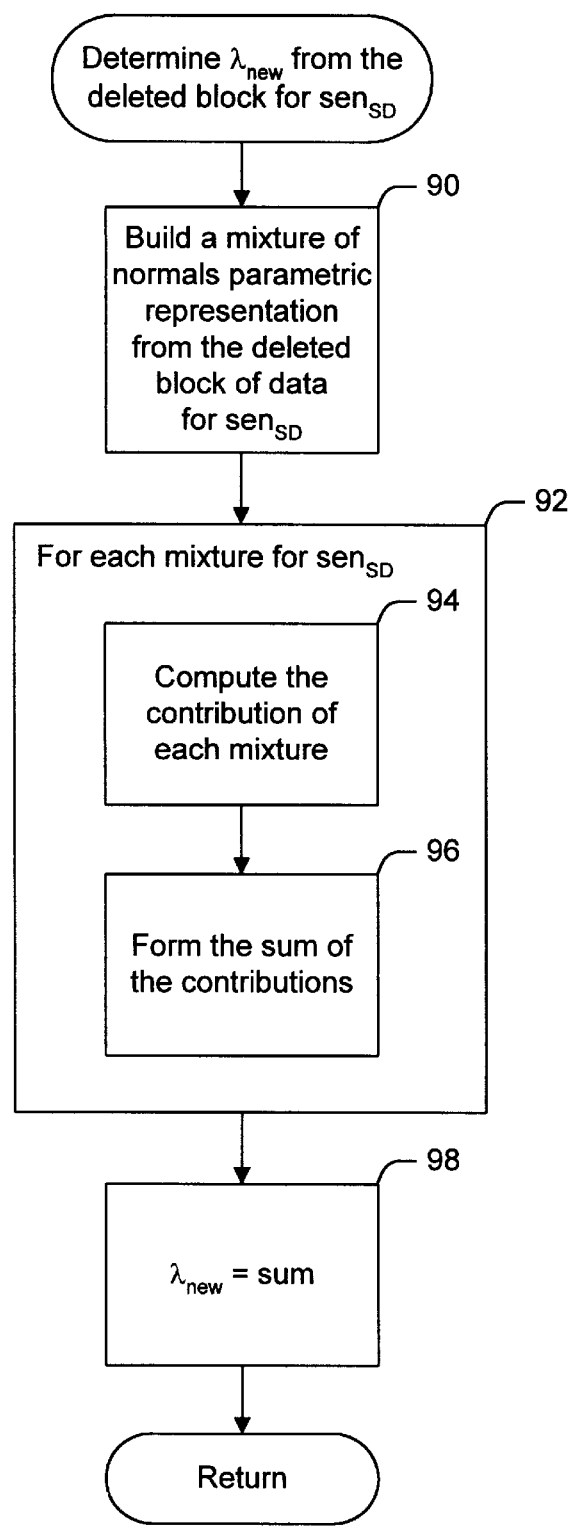
FIG. 5 is a flow diagram of a first alternate embodiment for calculating a new value for lambda as used in the system of FIG. 3.
Figure 6:
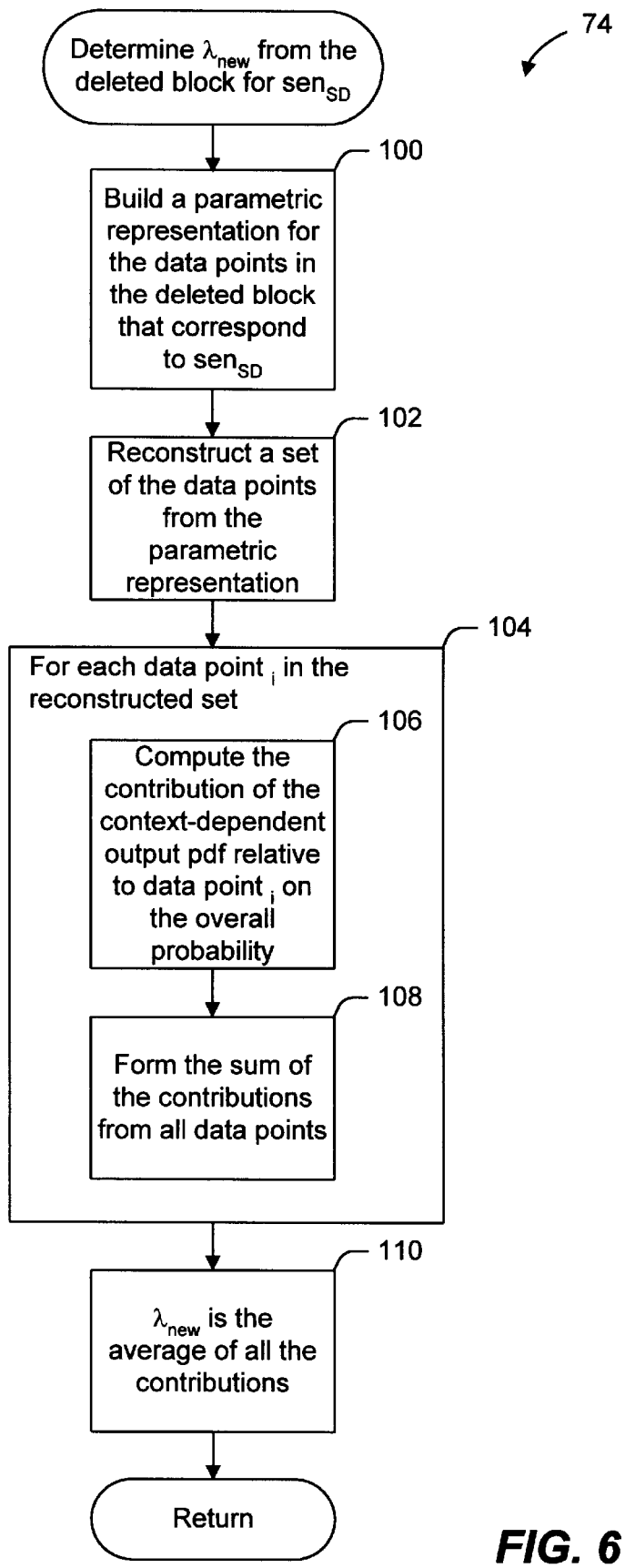
FIG. 6 is a flow diagram of a second alternate embodiment for calculating a new value for lambda as used in the system of FIG. 3.

FIGS. 5 and 6 depict these alternate embodiments for the calculation of the weighting factors. FIG. 5 depicts the first alternate embodiment. Referring to FIG. 5, a parametric representation for the data points in the deleted block is generated as shown in step 90. In this case, the parametric representation is a mixture of Gaussians. This representation can be made using the Baum-Welch algorithm as described above. The parameters generated include the mean, $\mu_j$, and weight, $c_j$, for each mixture component j. The computation of the new value of lambda, $\lambda_{new}$, can be made in accord with the following mathematical definition for a deleted block $\mu_j$:

$$\lambda_{new} = \sum_{j=1}^{M} \frac{c_j * (\lambda * b_1(\mu_j))}{(\lambda * b_1(\mu_j) + (1-\lambda) * b_2(\mu_j))} \quad (5)$$

where

M=number of normal mixture components;

$C_j$=weight of the jth normal mixture component;

note that $\sum_{j=1}^{M} c_j = 1$ $\mu_j$=mean of the jth normal mixture component.

Steps 92–98 perform this calculation in the following manner. Step 92 iterates for each mixture and determines the contribution of the context-dependent output probability over the overall probability for the mixture having the corresponding mean and weight parameters. For mixture components, this is represented mathematically as:

$$\frac{c_j * (\lambda * b_1(\mu_j))}{\lambda * b_1(\mu_j) + (1-\lambda) * b_2(\mu_j)} \quad (6)$$

In step 96, the sum of these contributions is formed for all the mixture components. In step 98, the final sum resulting from step 96 is stored as the value of $\lambda_{new}$ for the current $\text{sen}_{SD}$ and the deleted block.

Referring to FIG. 3, at the completion of the K iterations, the process proceeds to calculate the average value for $\lambda_{new}$ in step 76 in accord with equation (3) above. The process continues as described above with reference to FIG. 3 until the process converges and the current average value $\lambda_{new}$ is stored in the lambda table 26 for the particular context-dependent senone.

In the second alternative embodiment of the calculation of the weighting factors, a select number of data points are used, which are randomly generated from a parametric representation for the senone. FIG. 6 depicts this second alternate embodiment which can be described mathematically for a deleted block according to equation (2) set forth above, except that $\{x_i\}$=generated data points and N=the number of generated data points.

This alternative embodiment differs from the preferred embodiment, shown in FIG. 3, in the determination of the new value of $\lambda_{new}$, (step 74). The flow sequence remains as shown in FIG. 3. Referring to FIG. 6, in step 100, a parametric representation is generated for the data points in the deleted block. The parametric representation can consist of a mixture of Gaussians. This parametric representation can be derived using the Baum-Welch algorithm on the training data in the deleted block. From this parametric representation, a prescribed number of data points is reconstructed using a random number generator with the mean and weight parameters, as shown in step 102. The number of data points that are reconstructed is a trade-off between the desired accuracy of $\lambda_{new}$ and the computational requirements. A higher number of data points improves the accuracy of the $\lambda_{new}$ at the cost of greater computational requirements. A suitable number of reconstructed data points per mixture is 100.

In step 104, steps 106 and 108 are performed for each data point in the set, step 104. In step 106, the contribution of the context-dependent output probability over the overall probability for the data point is determined. This can be represented mathematically as:

$$\frac{(\lambda * b_1(x_i))}{(\lambda * b_1(x_i) + (1-\lambda) * b_2(x_i))} \quad (9)$$

In step 108, the sum of these contributions is formed for all the data points in the set. At the completion of the iteration through all the data points in the set, the average of all of the contributions is returned as the value of $\lambda_{new}$, (step 110). Referring to FIG. 3, at the completion of the K iterations, the process proceeds to calculate the average value for $\lambda_{new}$ in step 76 in accord with equation (3) above. The process continues as described above with reference to FIG. 3 until the process converges and the current average value $\lambda_{new}$ is stored in the lambda table 26 for the particular context-dependent senone.

Once the training data has been generated and stored in the appropriate storage locations, the recognition system is ready to execute. The primary task of the speech recognition system is to detect the linguistic message which is embodied in the input speech signal. This task is a multi-level decoding problem since it requires matching the sequence of feature vectors to a sequence of phonemes, matching the sequence of phonemes to a sequence of words, and matching the sequence of words to a sentence. This is performed by forming all possible linguistic expressions that have been modeled and calculating the probability that the expression matches the sequence of feature vectors. Since a linguistic expression is composed of a sequence of phonemes, the determination can involve calculating the likelihood that the phonemes forming the expression match the feature vectors and that the expression is likely to occur (i.e., grammatically correct). The probability that the phonemes forming an expression match the feature vectors can be referred to as an acoustic score and the probability that the expression occurs can be referred to as the language score. The language score takes into consideration the syntax and semantics of the language, such as the grammar of the language, and indicates whether the sequence of words corresponding to the sequence of phonemes form a grammatically-correct linguistic expression.

In the preferred embodiment, phonemes are represented by HMMs where the output pdf of like states are clustered forming senones. The process of matching a feature vector to a phoneme then entails matching a feature vector to the senones associated with the states of a HMM representing the phoneme. Thus, the linguistic expression can be composed of senones corresponding to states of a sequence of HMMs.

In the preferred embodiment of the invention, the task of the recognition engine can be one of finding the word sequence W which maximizes the probability P(W/X). The probability P(W/X) represents the probability of the linguistic expression W occurring given the input speech signal X. W can be a word string denoted as $W=w_1, w_2, \ldots, w_n$, where $w_i$ denotes individual words, each word is represented by a sequence of phonemes, $w_i=p_1, p_2, \ldots, p_q$, and X is the input speech signal represented by a sequence of feature vectors, denoted as $X=x_1, x_2 \ldots x_n$. This maximization problem can be solved using a modified version of the well-known Bayes formula which is described mathematically as:

$$P(W/X)=(P(X/W)P(W))/P(X). \quad (10)$$

P(X/W) is the probability that the input speech signal X matches the word string W, and is referred to as the acoustic score. P(W) is the probability that the word string W will occur, and is referred to as the language score. Since P(X) is independent of W, maximizing P(W/X) is equivalent to maximizing the numerator, namely P(X/W)P(W) over all word sequences W.

The recognition task considers various word sequences in trying to determine the best match. For each word sequence that is considered by the recognition task, it computes an acoustic score and a language score. A language score indicates how likely the word sequence is, in the language, and is indicated by the term P(W) in the above equation (10). An acoustic score indicates how well the sequence of acoustic vector features matches the acoustic model for the word sequence W. The acoustic score is indicated by the term P(X/W) in the above formula.

In computing the acoustic score for a given word sequence, the recognition task considers various senone alignments. A senone alignment is a mapping from the sequence of acoustic feature vectors to senones which assigns a unique senone to each acoustic feature vector. Only the senone alignments which would result in the word sequence under consideration are considered by the recognition task. An acoustic score for the word sequence under the constraints of each senone alignment is computed. The acoustic score for the word sequence is the best acoustic score over all possible senone alignments.

Mathematically, this can be expressed as:

$$P(X/W) = \text{Max } [P(X/(W, A_i))] \text{over } i=1 \text{ to } q$$

where $A_1 \ldots A_q$ = all possible senone alignments for word sequence W.

The computation of the acoustic score for word sequence W under the constraint of a given senone alignment A can be further expressed as:

$$P(X/(W, A)) = \left(\prod_{i=1}^{n} P(x_i/sd_i)\right) * P(A) \quad (11)$$

where senone alignment A aligns or maps the ith acoustic feature vector $x_i$ to the context dependent senone $sd_i$. $P(A)$ represents the state transition probability for the senone sequence $sd_i \ldots sd_n$. $P(x_i/sd_i)$ represents the probability that feature version $x_i$ matches context-dependent senone $sd_i$.

The essence of the acoustic score is the computation of the output probability p(x|sd). This represents the likelihood that the feature vector, x, matches the senone, sd, which corresponds to a context-dependent HMM state. However, a poorly estimated output pdf can contribute to inaccuracies in the computation of the acoustic score. This usually occurs due to insufficient training data. The robustness of the distribution increases with the use of more training data to estimate output pdf.

One way to reduce this problem is to utilize several HMMs which model the same phenomes at several levels of detail. The output pdf for a particular state can then be constructed by using the output pdfs at various levels of detail and combining them. The combination is done based on the ability to predict data not seen during training. A robust output pdf which is more adept at predicting unseen data will receive a higher weight while a poorly estimated output pdf will receive a lower weight in the combined output pdf. In the preferred embodiment, several context-dependent HMNs and a context-independent HMM are utilized to model a phoneme. In this embodiment, the several context-dependent HMMs provide more-detailed acoustic models and each context-independent HMM provides a less-detailed acoustic model. A weighting factor, $\lambda$, for each senone corresponding to a context-dependent state which was computed previously in the training phase is used to indicate the weight each senone is given. The larger $\lambda$ is (approaches 1.0) the more the context-dependent senone dominates and the less the context-independent senone is weighed. When $\lambda$ is small (approaches 0.0), the context-independent senone dominates. Thus, the computation of the output probability, p(x|sd), can be represented by the following mathematical definition:

$$p(x|sd) = \lambda * p(x|sd_d) + (1-\lambda) * p(x|sd_i), \quad (12)$$

where $\lambda$ is the weighting factor between 0 and 1 for senone sd;
x is the feature vector;
$sd_d$ is the senone associated with a state of a context-dependent HMM;

$sd_i$ is the senone associated with the corresponding state of a context-independent HMM;
$p(x|sd_d)$ is the probability of the feature vector x matching senone $sd_d$; and
$p(x|sd_i)$ is the probability of the feature vector x matching senone $sd_i$.

Thus, the output probability, p(x|sd), is linearly interpolated as a function of the output probabilities of context-dependent and context-independent senones. The weighting or interpolation factor $\lambda$ indicates the degree to which each senone is interpolated.

Figure 8:
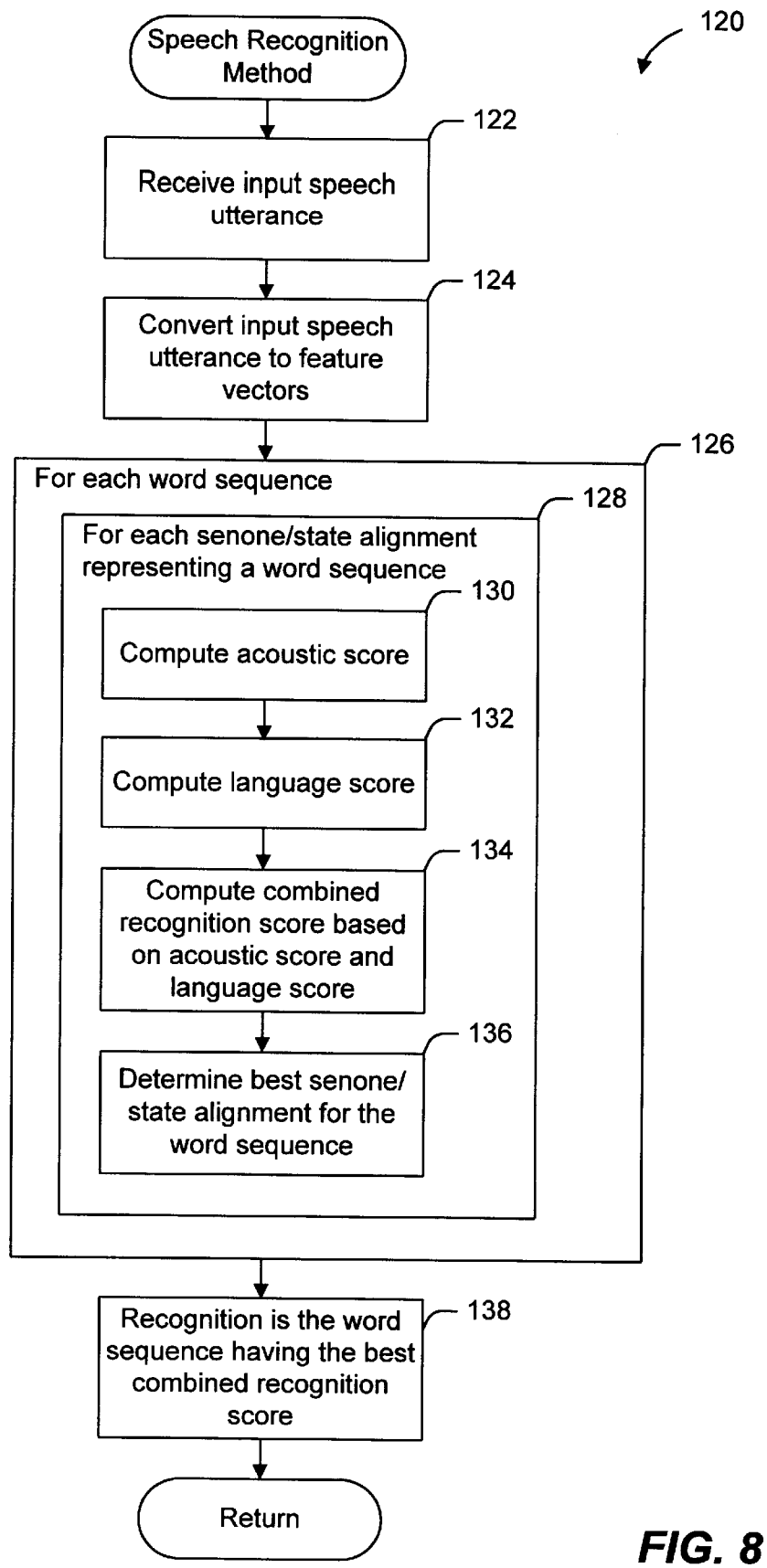
FIG. 8 is a flow diagram of the speech recognition method used in the system of FIG. 1.

FIG. 8 depicts the operation of the speech recognition method. Referring to FIG. 8, the method commences by receiving an input speech utterance, (step 122), which is converted to feature vectors (step 124), which was previously detailed above with reference to FIG. 1. In step 126, the method performs steps 128–136 for each word sequence that can represent the input speech utterance. The word sequence can consist of a variety of different senone alignments, where each senone alignment corresponds to a sequence of HMM states. In steps 128–134 a combined recognition score for each possible senone alignment which can represent the word sequence is determined. The combined recognition score can be determined in accord with the modified Bayes formula as denoted above in equation (10). The combined recognition score consists of an acoustic score and a language score. The acoustic score is determined in step 130, the language score is determined in step 132, and the combined score is computed in step 134. The senone alignment having the highest combined recognition score is then selected to represent the word sequence, step 136. In step 138, the method recognizes the input speech utterance as the word sequence having the highest combined recognition score.

In step 130, the acoustic score can be determined as described above in accord with equation (11) where the output probability is computed as described above in equation (12).

In step 132, the method computes a language score based on the language models representing linguistic expressions stored in language model storage 32. Language models use knowledge of the structure and semantics of a language in predicting the likelihood of the occurrence of a word considering the words that have been previously uttered. The language model can be a bigram language model where the language score is based on the probability of one word being followed by a particular second word. Alternatively, the language model may be based on N-grams other than bigrams or each on subword language probabilities. In addition, other lexical knowledge such as syntax and grammatical rules can be employed to create the language model. Methods for creating and using language models are well-known in the art and are described in more detail in the Huang et al. book referred to above.

The above detailed invention improves the recognition capability of a speech recognition system by utilizing multiple continuous density output probabilities corresponding to the same speech event in different contexts. This improves the mapping of the feature vectors to the hidden Markov models since it improves the model's performance in predicting speech events that the model was not trained with. An improvement at this level is extremely beneficial since the mapping at this level is the foundation upon which the recognition process further builds on.

However, it should be noted that this invention is not restricted to a speech recognition system. Any application which requires the matching of a speech utterance to a linguistic expression can utilize the claimed invention. The speech utterance can be any form of acoustic data, such as but not limited to, sounds, speech waveforms, and the like. An example of such an application is a speech synthesis system which utilizes probabilistic models to generate a speech waveform from a text string representing a linguistic expression.

Although the preferred embodiment of the invention has been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. A method in a computer system for matching an input speech utterance to a linguistic expression, the method comprising the steps of:

for each of a plurality of phonetic units of speech, providing a plurality of more-detailed acoustic models and a less-detailed acoustic model to represent the phonetic unit, each acoustic model having a plurality of states followed by a plurality of transitions, each state representing a portion of a speech utterance occurring in the phonetic unit at a certain point in time and having an output probability indicating a likelihood of a portion of an input speech utterance occurring in the phonetic unit at a certain point in time;

for each of select sequences of more-detailed acoustic models, determining how close the input speech utterance matches the sequence, the matching further comprising the step of:

for each state of the select sequence of more-detailed acoustic models, determining an accumulative output probability as a combination of the output probability of the state and a same state of the less-detailed acoustic model representing the same phonetic unit; and determining the sequence which best matches the input speech utterance, the sequence representing the linguistic expression.

2. A method as in claim 1 where each acoustic model is a continuous density hidden Markov model.

3. A method as in claim 1 wherein the step of determining the output probability further comprises the step of weighing the less-detailed model and more-detailed model output probabilities with separate weighting factors when combined.

4. A method as in claim 1 wherein the step of providing a plurality of more-detailed acoustic models further comprises the step of training each acoustic model using an amount of training data of speech utterances; and wherein the step of determining the output probability further comprises the step of weighing the less-detailed model and more-detailed model output probabilities relative to the amount of training data used to train each acoustic model.

5. A method in a computer system for determining a likelihood of an input speech utterance matching a linguistic expression, the input speech utterance comprising a plurality of feature vectors indicating acoustic properties of the utterance during a given time interval, the linguistic expression comprising a plurality of senones indicating the output probability of the acoustic properties occurring at a position within the linguistic expression, the method comprising the steps of:

providing a plurality of context-dependent senones;

providing a context-independent senone associated with the plurality context-dependent senones representing a same position of the linguistic expression;

providing a linguistic expression likely to match the input speech utterance;

for each feature vector of the input speech utterance, determining the output probability that the feature vector matches the context-dependent senone in the linguistic expression which occurs at the same time interval as the feature vector, the output probability determination utilizing the context-independent senone associated with the context-dependent senone; and utilizing the output probabilities to determine the likelihood that the input speech utterance matches the linguistic expression.

6. A method as in claim 5 wherein the output probability comprises a continuous probability density function.

7. A method as in claim 5 wherein the step of providing a plurality of context-dependent senones further comprises the step of training the context-dependent senones from an amount of training data representing speech utterances;

wherein the step of providing a context-independent senone further comprises the step of training the context-independent senones from the amount of training data; and wherein the step of determining the output probability further comprises the step of combining the context-independent and context-dependent senones in accord with the amount of training data used to train the senones.

8. A method as in claim 5 wherein the step of providing a plurality of context-dependent senones further comprises the steps of:

training the context-dependent senones from an amount of training data representing speech utterances;

providing a weighting factor for each context-dependent senone representing the amount of training data used to estimate the senone; and wherein the step of determining the output probability further comprises the step of combining the context-dependent senone and context-independent senone in accord with the weighing factor.

9. A method as in claim 8 wherein the step of providing a weighting factor further comprises the step of generating the weighting factor by using a deleted interpolation technique on the amount of training data.

10. A method as in claim 8 wherein the step of providing a weighting factor further comprises the steps of:

producing a parametric representation of the training data; and generating the weighing factor by applying a deleted interpolation technique to the parametric representation of the amount of training data.

11. A method as in claim 8 wherein the step of providing a weighting factor further comprises the steps of:

producing a parametric representation of the training data;

providing a set of data points from the parametric representation of the training data, the data points representing the training data; and generating the weighing factor from the application of deleted interpolation to the data points.

12. A method in a computer readable storage medium for recognizing an input speech utterance, said method comprising the steps of:

training a plurality of context-dependent continuous density hidden Markov models to represent a plurality of phonetic units of speech, the training utilizing an amount of training data of speech utterances representing acoustic properties of the utterance during a given time interval, each model having states connected by transitions, each state representing a portion of the phonetic unit and having an output probability indicating a probability of an acoustic property of a speech utterance occurring within a portion of the phonetic unit;

providing a context-independent continuous density hidden Markov model for the plurality of context-dependent continuous density hidden Markov models representing the same phonetic unit of speech;

providing a plurality of sequences of the context-dependent models, each sequence representing a linguistic expression;

for each sequence of the context-dependent models, determining an acoustic probability of the acoustic properties of the input speech utterance matching the states in the sequence of the context-dependent models, the acoustic probability comprising the output probability of each state of each context-dependent model in the sequence and the output probability of the context-independent model corresponding to a same phonetic unit; and utilizing the acoustic probability to recognize the linguistic expression which closely matches the input speech utterance.

13. A method as in claim 12, further comprising the step of providing a weighting factor for each state of the context-dependent models, the weighting factor indicating the amount of training data used to train the output probability associated with each state; and wherein the step of determining an acoustic probability further comprises the step of weighing the output probability of the state of the context-dependent model and the state of the context-independent model based on the weighting factor.

14. A method as in claim 13 wherein the step of providing a weighting factor further comprises the step of deriving the weighting factor from an application of deleted interpolation to the amount of training data.

15. A method as in claim 13 wherein the step of providing a weighting factor further comprises the steps of:

producing a parametric representation of the training data; and deriving the weighting factor from an application of deleted interpolation to the parametric representation of the training data.

16. A method as in claim 13 wherein the step of providing a weighting factor further comprises the steps of:

producing a parametric representation of the training data;

generating a set of data points from the parametric representation of the training data; and deriving the weighting factor from an application of deleted interpolation to the parametric representation of the training data.

17. A computer system for matching an input speech utterance to a linguistic expression, comprising:

a storage device for storing a plurality of context-dependent and context-independent acoustic models representing respective ones of phonetic units of speech, the plurality of context-dependent acoustic models which represent each phonetic unit having at least one associated context-independent acoustic model representing the phonetic unit of speech, each acoustic model comprising states having transitions, each state representing a portion of the phonetic unit at a certain point in time and having an output probability indicating a likelihood of a portion of the input speech utterance occurring in the phonetic unit at a certain point in time;

a model sequence generator which provides select sequences of context-dependent acoustic models representing a plurality of linguistic expressions likely to match the input speech utterance;

a processor for determining how well each of the sequence of models matches the input speech utterance, the processor matching a portion of the input speech utterance to a state in the sequence by utilizing an accumulative output probability for each state of the sequence, the accumulative output probability including the output probability of each state of the context-dependent acoustic model combined with the output probability of a same state of the associated context-independent acoustic model; and a comparator to determine the sequence which best matches the input speech utterance, the sequence representing the linguistic expression.

18. A system as in claim 17 wherein each acoustic model is a continuous density hidden Markov model.

19. A system as in claim 17, further comprising:

a training device to receive an amount of training data of speech utterances and to estimate the output probability for each state of each acoustic model with the amount of training data; and wherein the processor further comprises a combining element to determine the accumulative output probability of each state, the combining element combining the output probability of each state of the sequence with the output probability of a same state of the associated context-independent acoustic model relative to the amount of training data used to estimate each output probability.

20. A system as in claim 17, further comprising:

a training device to receive an amount of training data of speech utterances used to estimate the output probability for each state of each acoustic model with the amount of training data, the training device generating a weighting factor for each state of each context-dependent acoustic model indicating a degree to which the output probability can predict speech utterances not present in the training data; and wherein the processor further comprises a combining element to determine the accumulative output probability of a state, the combining element combining the output probability of each state of the sequence with the output probability of a same state of the associated context-independent acoustic model relative to the weighting factor for each state.

21. A system as in claim 20 wherein the weighting factor is derived by applying a deleted interpolation technique to the amount of the training data.

22. A system as in claim 20 wherein the training device further comprises a parametric generator to generate a parametric representation of the training data; and wherein the weighting factor is derived by applying a deleted interpolation technique to the parametric representation of the training data.

23. A system as in claim 20 wherein the training device further comprises:

a parametric generator to produce a parametric representation of the training data;

a data generator to generate a set of data points from the parametric representation; and wherein the weighting factor is derived by applying a deleted interpolation technique to the set of data points.

* * * * *

UNITED STATES PATENT AND TRADEMARK OFFICE
CERTIFICATE OF CORRECTION

PATENT NO.   : 5,937,384
DATED        : August 10, 1999
INVENTOR(S)  : Huang et al.

Page 1 of 1

It is certified that error appears in the above-identified patent and that said Letters Patent is hereby corrected as shown below:

Column 7,
Line 64, "$\propto$ is missing.

Column 8,
Line 60, change "sense" to "$sens_{SI}$".
Line 67, change "$\mid \lambda - \lambda_{new} <$" to "$\mid \lambda - \lambda_{new} \mid <$".

Column 12
Line 32, change "P (W/X represents" to "P(W/X) represents"

Column 13,
Line 46, change "HMNS" to HMMS".

Signed and Sealed this

Twenty-first Day of August, 2001

Attest:

*Nicholas P. Godici*

NICHOLAS P. GODICI
*Attesting Officer*   *Acting Director of the United States Patent and Trademark Office*